US006914711B2

(12) United States Patent
Novotny et al.

(10) Patent No.: US 6,914,711 B2
(45) Date of Patent: Jul. 5, 2005

(54) SPATIAL LIGHT MODULATOR WITH HIDDEN COMB ACTUATOR

(75) Inventors: Vlad J. Novotny, Los Gatos, CA (US); Paren Shah, Palo Alto, CA (US)

(73) Assignee: Active Optical Networks, Inc., Fremont, CA (US)

( * ) Notice: Subject to any disclaimer, the term of this patent is extended or adjusted under 35 U.S.C. 154(b) by 0 days.

(21) Appl. No.: 10/394,835

(22) Filed: Mar. 22, 2003

(65) Prior Publication Data

US 2004/0184132 A1 Sep. 23, 2004

(51) Int. Cl.[7] .............................................. G02B 26/00
(52) U.S. Cl. ..................... 359/291; 359/224; 359/292; 359/295; 359/298
(58) Field of Search ................................ 359/223, 224, 359/290–292, 295, 298

(56) References Cited

U.S. PATENT DOCUMENTS

| 3,886,310 | A |   | 5/1975  | Guldberg et al. |         |
|-----------|---|---|---------|-----------------|---------|
| 3,896,338 | A |   | 7/1975  | Nathanson et al.|         |
| 4,229,081 | A |   | 10/1980 | Jones et al.    |         |
| 4,229,732 | A |   | 10/1980 | Hartstein et al.|         |
| 4,492,435 | A |   | 1/1985  | Banton et al.   |         |
| 4,566,935 | A |   | 1/1986  | Hornbeck        |         |
| 4,662,746 | A |   | 5/1987  | Hornbeck        |         |
| 5,535,047 | A |   | 7/1996  | Hornbeck        | 359/295 |
| 5,610,757 | A |   | 3/1997  | Ji et al.       | 359/295 |
| 5,739,941 | A |   | 4/1998  | Knipe et al.    | 359/224 |
| 5,808,780 | A |   | 9/1998  | McDonald        | 359/290 |
| 5,943,157 | A |   | 8/1999  | Florence et al. | 359/290 |
| 6,060,336 | A | * | 5/2000  | Wan             | 438/50  |
| 6,384,952 | B1| * | 5/2002  | Clark et al.    | 359/224 |
| 6,541,831 | B2| * | 4/2003  | Lee et al.      | 257/415 |
| 6,593,677 | B2| * | 7/2003  | Behin et al.    | 310/309 |
| 6,612,029 | B2| * | 9/2003  | Behin et al.    | 29/847  |
| 6,758,983 | B2| * | 7/2004  | Conant et al.   | 216/2   |
| 2002/0005976 | A1 |   | 1/2002 | Behin et al.  |         |
| 2002/0127760 | A1 |   | 9/2002 | Yeh et al.    |         |
| 2003/0218793 | A1 | * | 11/2003 | Soneda et al. | 359/291 |
| 2004/0032634 | A1 | * | 2/2004 | Hah et al.    | 359/224 |

OTHER PUBLICATIONS

"Why is the Texas Instruments Digital Micromirror Device™ (DMD™) so Reliable?" Downloaded at http://www.ti.com/dlp. 7 pages, no date.

"Supercritical Carbon Dioxide Solvent Extraction from Surface–Micromachined Micromechanical Structures." SPIE Micromachining and Microfabrication, Oct. 1996. 12 pages.

* cited by examiner

Primary Examiner—Evelyn A. Lester
(74) Attorney, Agent, or Firm—Silicon Edge Law Group LLP; Arthur J. Behiel

(57) ABSTRACT

Described are Micro-Electro-Mechanical Systems (MEMS) actuators with hidden combs and hinges. The ability to hide the combs renders the actuators useful in digital micromirror devices. Comb actuators provide increased torque, which facilitates the use of stiffer, less fragile hinge structures. Also important, comb actuators do not require mechanical stops to define stable states, and thus avoid problems associated with physical contact. The actuators are infinitely variable through a range of angles.

45 Claims, 14 Drawing Sheets

SPATIAL LIGHT MODULATOR WITH HIDDEN COMB ACTUATOR

BACKGROUND

Spatial Light Modulators (SLMs) have found numerous applications in the areas of optical information processing, projection displays, video and graphics monitors, televisions, and electrophotographic printing. SLMs are devices that modulate incident light in a spatial pattern to form an image corresponding to an electrical or optical input. The incident light may be modulated in its phase, intensity, polarization, or direction. The light modulation may be achieved with a variety of materials exhibiting various reflective, refractive, diffractive, electro-optic or magneto-optic effects, or with materials that modulate light by surface deformation.

An SLM typically includes an area or linear array of addressable picture elements (pixels). Using well-known algorithms, source pixel data (e.g., data representing an image) is formatted by an associated control circuit and loaded into the pixel array using any of a number of well-known addressing schemes, typically addressing all pixels in parallel.

One type of SLM, referred to herein as a micro-mirror array, is a monolithic integrated circuit with an array of movable micro-mirrors fabricated over the requisite address, control and drive circuitry. Micro-mirrors are normally bistable, switching between two stable positions in response to digital control signals. Each mirror in a given array forms one pixel, wherein a source of light directed upon the mirror array will be reflected in one of two directions depending upon the selected one of the two stable mirror positions. In an "on" mirror position, incident light to a given mirror is reflected to a projector lens and focused on a display screen or a photosensitive element of a printer; in an "off" mirror position, light directed on the mirror is deflected to a light absorber outside of the numerical aperture of the projecting lens.

When the micro-mirror array is used in a display, the projector lens magnifies the modulated light from the pixel mirrors onto a display screen. Gray scale of the pixels forming the image is achieved by pulse-width modulation, as described in U.S. Pat. No. 5,278,652, entitled "DMD Architecture and Timing for Use in a Pulse-Width Modulated Display System," which is incorporated herein by reference.

For more detailed discussions of conventional micro-mirror devices, see the following U.S. patents, each of which is incorporated herein by reference:

1. U.S. Pat. No. 5,535,047 to Hornbeck, entitled "Active Yoke Hidden Hinge Digital Micro-mirror Device;
2. U.S. Pat. No. 5,079,544 to DeMond, et al, entitled "Standard Independent Digitized Video System"; and
3. U.S. Pat. No. 5,105,369 to Nelson, entitled "Printing System Exposure Module Alignment Method and Apparatus of Manufacture."

The evolution and variations of the micro-mirror devices can be appreciated through a reading of several issued patents. The "first generation" micro-mirror based spatial light modulators were implemented with analog control of electrostatically driven mirrors using parallel-plate configurations. That is, an electrostatic force was created between the mirror and the underlying address electrode to induce deflection thereof. The deflection of these mirrors can be variable and operate in the analog mode, and may comprise a leaf-spring or cantilevered beam, as disclosed in the following U.S. Patents, each of which is incorporated herein by reference:

1. U.S. Pat. No. 4,662,746 to Hornbeck, entitled "Spatial Light Modulator and Method";
2. U.S. Pat. No. 4,710,732 to Hornbeck, entitled "Spatial Light Modulator and Method";
3. U.S. Pat. No. 4,956,619 to Hornbeck, entitled "Spatial Light Modulator"; and
4. U.S. Pat. No. 5,172,262 to Hornbeck, entitled "Spatial Light Modulator and Method."

This first generation micro-mirror can also be embodied as a digital or bistable device. The mirror is supported by a torsion hinge and axially rotated one of two directions 10 degrees, until the mirror tip lands upon a mechanical stop, or "landing pad." Such an embodiment is disclosed in U.S. Pat. No. 5,061,049 to Hornbeck entitled "Spatial Light Modulator and Method," which is incorporated herein by reference. To limit the static friction (stiction) force between the mirror tips and the landing pads, the landing pads may be passivated by an oriented monolayer formed upon the landing pad. This monolayer decreases the stiction forces and prevents the mirror from sticking to the electrode. This technique is disclosed in U.S. Pat. No. 5,331,454 to Hornbeck, entitled "Low Reset Voltage Process for DMD," and also incorporated herein by reference.

A "second generation" of micro-mirror device is embodied in U.S. Pat. No. 5,083,857 entitled "Multi-Level Deformable Mirror Device," and U.S. Pat. No. 5,583,688 entitled "Multi-level Digital Micro-mirror Device," both of which are incorporated herein by reference. In this second generation device, the mirror is elevated above a "yoke," this yoke being suspended over the addressing circuitry by a pair of torsion hinges. An electrostatic force is generated between the elevated mirror and an elevated electrode, again with parallel-plate actuator configuration. When rotated, it is the yoke that comes into contact with a landing electrode: the mirror tips never come into contact with any structure. The shorter moment arm of the yoke, being about 50% of the mirror, allows energy to be more efficiently coupled into the mirror by reset pulses due to the fact that the mirror tip is free to move. Applying resonant reset pulses to the mirror to help free the pivoting structure from the landing electrode is disclosed in U.S. Pat. No. 5,096,279, entitled "Spatial Light Modulator and Method," and U.S. Pat. No. 5,233,456 entitled "Resonant Mirror and Method of Manufacture," both of which are incorporated herein by reference. However, some of the address torque generated between the mirror and the elevated address electrode is sacrificed compared to the first generation devices because the yoke slightly diminishes the surface area of the address electrode.

Despite the aforementioned advances, parallel-plate electrostatic devices generate very low deflection torque and require very low stiffness suspension hinges. Consequently, conventional micro-mirrors are relatively fragile and difficult to fabricate, and may therefore suffer from low yield and increased manufacturing expense. Also, while various process techniques have been developed to ameliorate the stiction problem, the repeated physical contact between the moveable and fixed surfaces still reduces device reliability and lifetime. There is therefore a need for methods and actuators that significantly increase driving torque, eliminate or reduce effects of stiction, improve production yield, reduce micro-mirror production cost, and increase micro-mirror reliability.

DETAILED DESCRIPTION

Figure 1:
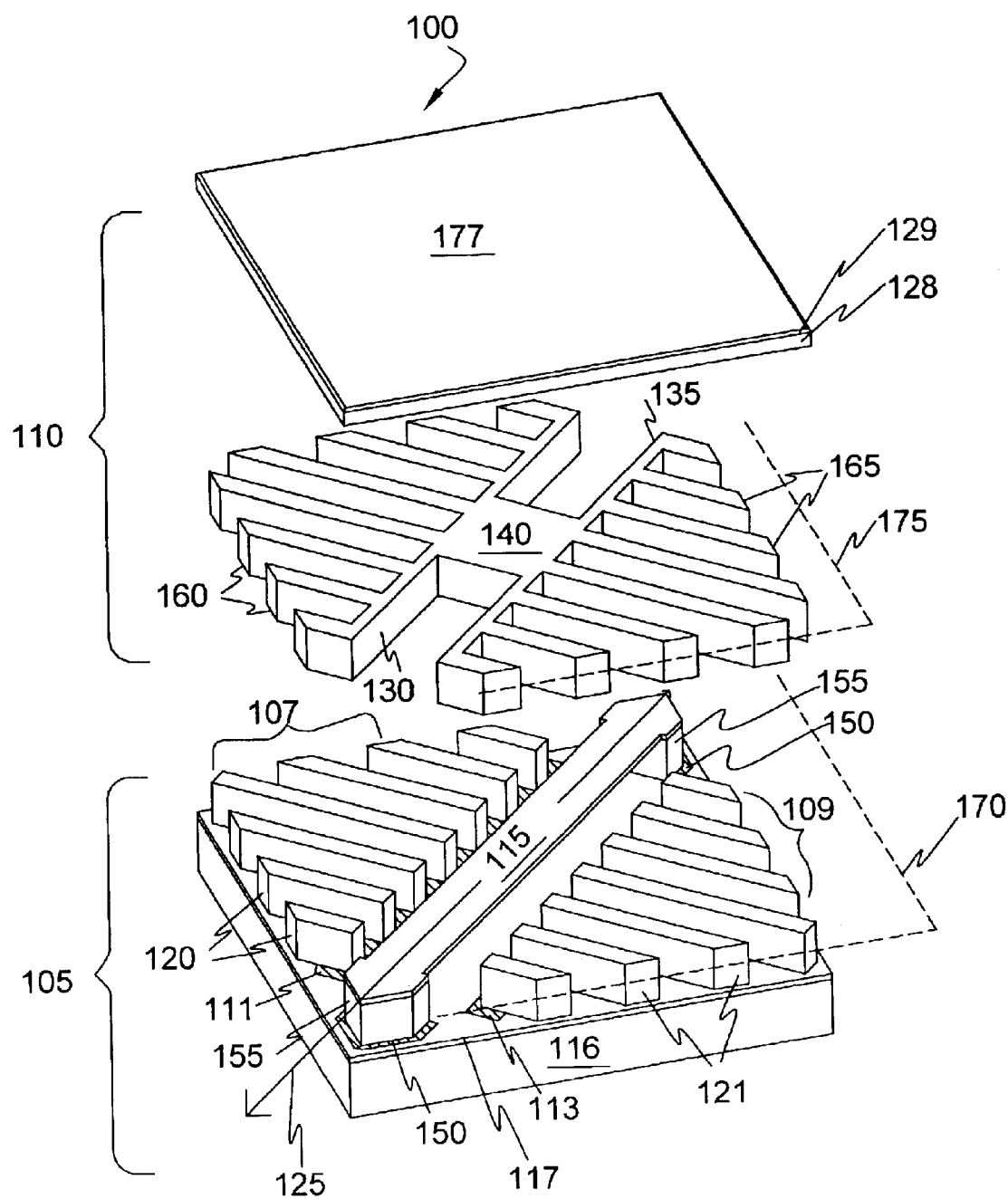
FIG. 1 depicts a Micro-Electro-Mechanical Systems (MEMS) actuator 100 in accordance with one embodiment of the invention.

FIG. 1 depicts a Micro-Electro-Mechanical Systems (MEMS) actuator 100 in accordance with one embodiment of the invention. Actuator 100 employs hidden comb electrostatic actuators that produce much greater torque than the parallel-plate electrostatic actuators of the above-referenced Hornbeck patents. Greater torque facilitates the use of stiffer, less fragile hinge structures. Also important, comb actuators adapted for use with the invention have a more stable response curve than parallel-plate actuators, and consequently afford greater position control. These and other advantages, and the means of achieving them, are detailed below.

Actuator 100 is broadly divided into a fixed portion 105 and a movable portion 110, the two of which are interconnected via a tortional hinge 115. Fixed portion 105 includes a pair of fixed combs 107 and 109 disposed over a respective pair of addressing electrodes 111 and 113, which are in turn disposed over a substrate 116 and through an insulating layer 117.

Substrate 116 is, in an embodiment formed using a monolithic fabrication process, a wafer with an application-specific integrated circuit (ASIC) that incorporates the control, driving, and addressing electronics for actuator 100. Actuator 100 is formed on top of substrate 116, e.g. in the manner described below in connection with FIGS. 4A–4Y.

The electronics can be implemented using any of a number of conventional device fabrication processes, including those commonly used to form Complementary Metal Oxide Semiconductor (CMOS) circuits. In embodiments formed using hybrid fabrication processes, actuators 100 and the ASIC electronics are formed separately, on different substrates, and later bonded together using any of a number of conventional bonding techniques, such as those commonly employed in "flip-chip" technologies. In such embodiments, the substrate upon which actuator 100 is formed, the so-called "handle" substrate, can be on top of actuator 100 from the perspective of FIG. 1A during fabrication and later removed after bonding to an ASIC wafer. The handle substrate can be e.g. silicon, glass, or some other sacrificial substrate.

Each of fixed combs 107 and 109 includes a respective plurality of teeth 120 and 121 that extend in the direction perpendicular to a fulcrum axis 125 defined along hinge 115. Fixed combs 107 and 109 are electrically isolated from one another so that disparate voltage levels can be applied thereto. Fixed combs 120 and 121 are all of a conductive material, such as highly doped polysilicon or polysilicon-germanium or metals or metal alloys, and are electrically connected to respective electrodes 111 and 113.

Movable portion 110 includes a pair of movable combs 130 and 135 connected to hinge 115 via a bridge 140. Moveable combs 130 and 135, bridge 140, and hinge 115 are all of a conductive material, such as doped polysilicon or polysilicon-germanium, metals, or metal alloys, and are electrically connected to a pair of contact pads 150 via a pair of conductive hinge posts 155. Teeth 160 and 165 of respective movable combs 130 and 135 are interdigitated from a perspective normal to a first plane 170 extending through the fixed combs and a second plane 175 extending through the movable combs.

An actuated member 177 covers the top surface of movable combs 130 and 135 and bridge 140. It is formed either by a single metallic layer such as gold or aluminum or by two layers 128 and 129. Layer 128 can be made from polysilicon or polysilicon-germanium while layer 129 can be made from highly reflective metal such as gold or aluminum or a metal alloy. In a typical embodiment, actuated member 177 is one of an array of mirrors used to form a spatial light modulator. Top portion 110 is tilted in one direction along fulcrum axis 125 (e.g., a positive direction) by holding movable combs 130 and 135 at ground potential while adjusting the voltage level applied to teeth 120 of fixed comb 107 to a level between e.g. zero and three volts or zero and five Volts. Applying a potential difference between combs 130 and 107 creates an electrostatic attraction that draws combs 130 and 107 together. With sufficient applied voltage, the teeth of the respective combs 130 and 107 interdigitate. To tilt top portion 110 in the opposite (e.g., negative) direction, movable combs 130 and 135 are held again at ground potential while adjusting the voltage level applied to teeth 121 of fixed comb 109. Movable combs 130 and 135 can both be moved, to a small extent, in a direction normal to planes 170 and 175, by applying the same potential to both fixed combs 107 and 109, thereby causing hinge 115 to flex toward substrate 116.

Figure 2:
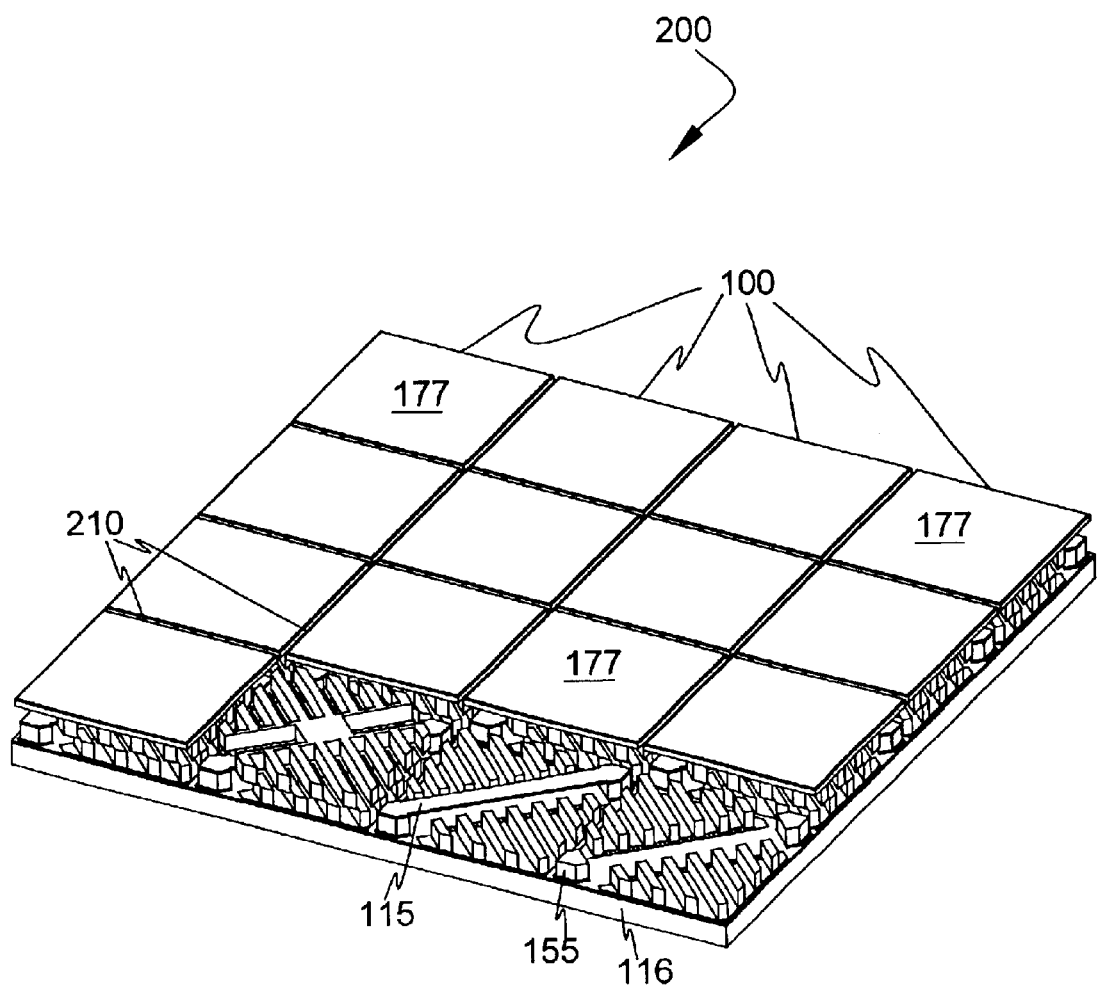
FIG. 2 depicts a mirror array 200 made up of sixteen (4×4) actuators 100 formed integrally on a single substrate 116.

FIG. 2 depicts a mirror array 200 made up of sixteen (4×4) actuators 100 formed integrally on a single substrate 116. Because actuated members 177 obscure the underlying actuators when viewed from a perspective normal to the mirror surfaces (the top surfaces of actuated members 177), three of actuated members 177 are removed to expose various underlying structures.

In array 200, the mirror surfaces are the active areas, and should be closely spaced. The mirror surfaces obscure the hidden comb actuators, allowing the combined active mirror surfaces to account for more than 85% of the total array surface, where the total array surface is the active mirror surface combined with interstitial spaces 210. In some embodiments, the active mirror surfaces account for more than 90% of the total array surface. Though not shown, the mirror surfaces may be of other shapes, preferably those that can be positioned close to one another without excessive interstitial spacing. Possible shapes include rectangles, hexagons, and triangles. Also important, actuator 100 and other embodiments of the invention do not include the conspicuous hole in the center of conventional micro-mirror arrays of the type described in the above-referenced U.S. Pat. No. 5,535,047. The elimination of these holes advantageously increases the active array surface.

Figure 3A:
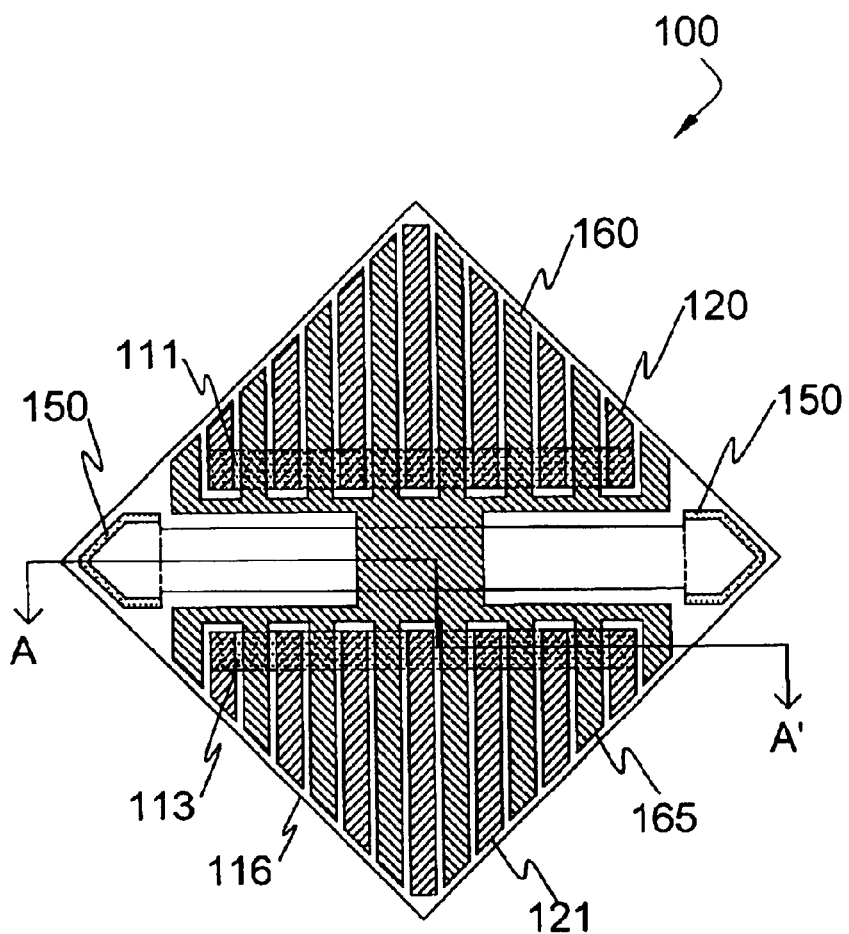
FIG. 3A is a top view of actuator 100 of FIG. 1.
Figure 3B:
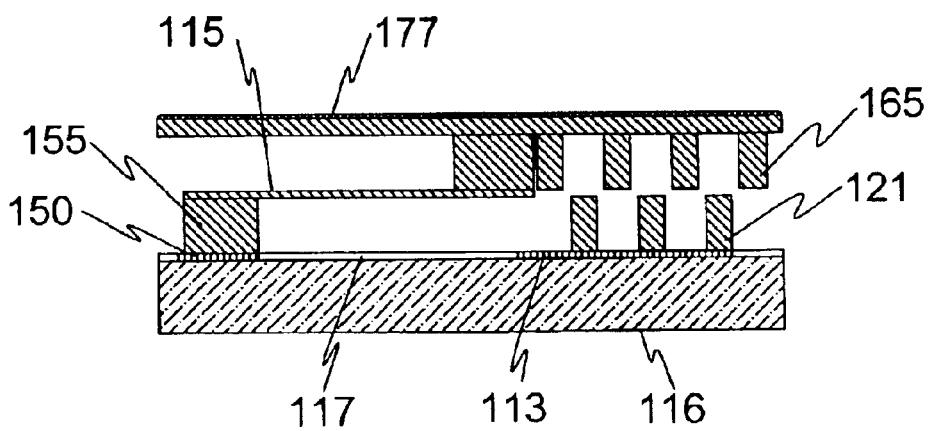
FIG. 3B is a cross-sectional diagram of actuator 100 taken along line A–A' of FIG. 3A.
Figure 3C:
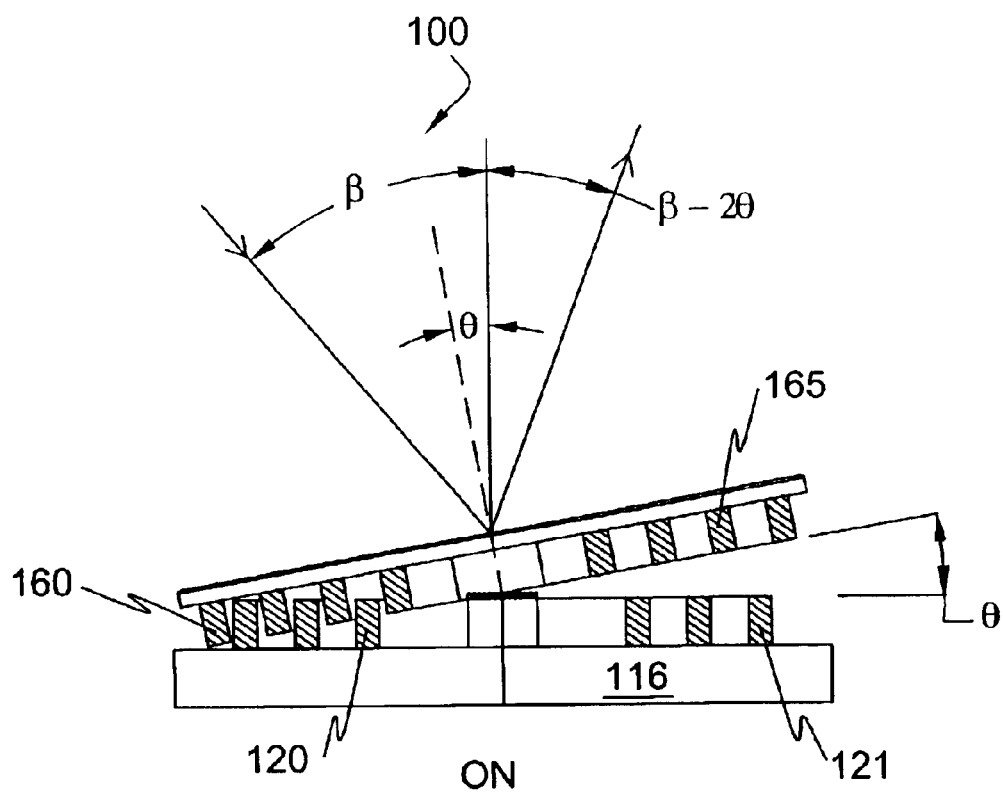
FIGS. 3C and 3D are side views of actuator 100 from a perspective parallel to the long dimension of hinge 115.
Figure 3D:
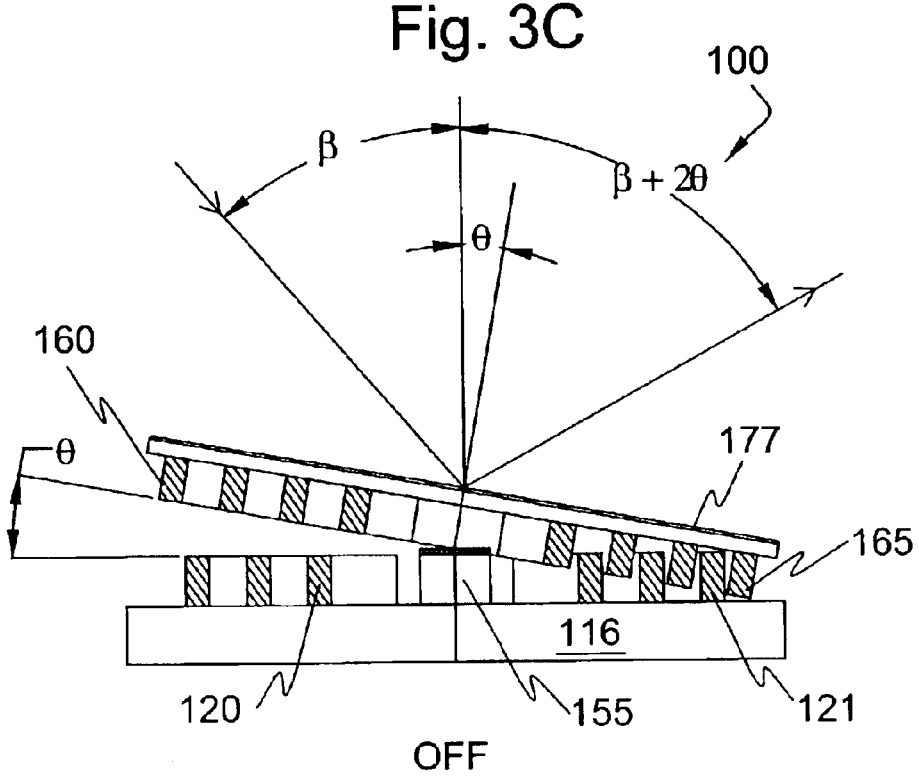

FIG. 3A is a top view of actuator 100 of FIG. 1: actuated member 177 is removed to show the spatial relationship between the movable and fixed combs. FIG. 3B is a cross-sectional diagram of actuator 100 taken along line A–A' of FIG. 3A. FIGS. 3C and 3D are side views of actuator 100 from a perspective parallel to the long dimension of hinge 115.

In FIG. 3C, a potential difference applied between fixed teeth 120 and movable teeth 160 tilts the surface of actuated member 177 θ degrees to the left, where θ is e.g. about ten degrees; in FIG. 3D, a potential difference applied between fixed teeth 121 and movable teeth 165 tilts the surface of actuated member 177 θ degrees to the right. (In FIGS. 3C and 3D, β refers to the angle of incidence, which is typically about 10 degrees.)

Figure 3E:
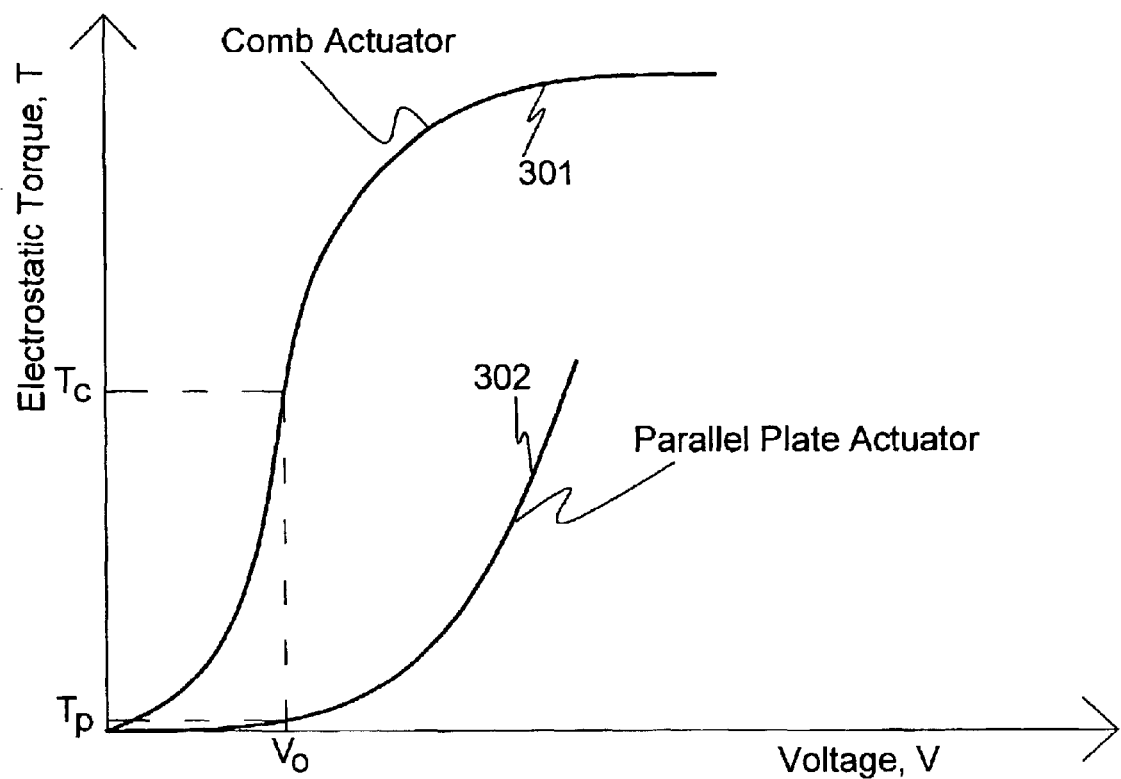
FIG. 3E depicts the relationship between electrostatic torque T and applied voltage V for a comb actuator (curve 301) and a parallel-plate actuator (curve 302) of the type employed in the above-referenced Hornbeck patents.

FIG. 3E depicts the relationship between electrostatic torque T and applied voltage V for a comb actuator (curve 301) and a parallel-plate actuator (curve 302) of the type employed in the above-referenced Hornbeck patents. The torque provided by the rotational comb actuators employed in various embodiments of the invention rises sharply with applied voltage and then saturates asymptotically with rotation as the movable and fixed teeth interdigitate. In contrast, the torque provided by rotational parallel-plate actuators rises with applied voltage and does not saturate. This characteristic produces a natural instability in rotational parallel-plate actuators. Due to this instability, the movable portion moves suddenly toward the fixed portion to collide with a physical stop. FIG. 3E additionally illustrates that, given the same applied voltage $V_0$, the torque $T_c$ of the comb actuators is much greater than the torque $T_p$ of the parallel-plate actuator.

Figure 3F:
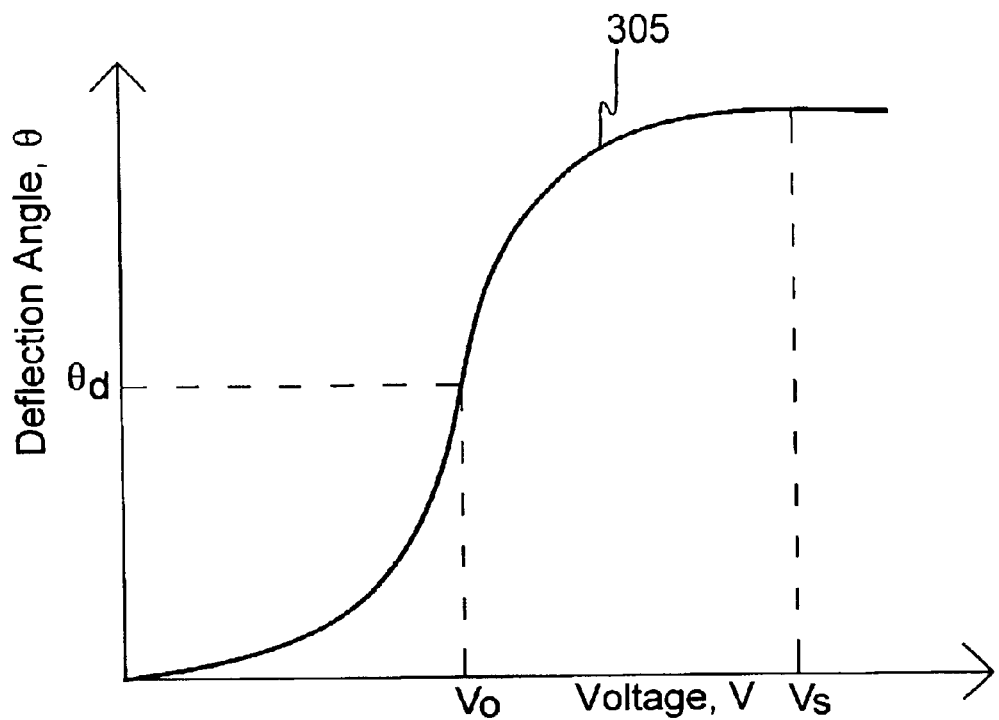
FIG. 3F includes a curve 305 illustrating the relationship between the deflection angle θ of rotational comb actuator 100 and the voltage V applied between the movable and fixed combs.

FIG. 3F includes a curve 305 illustrating the relationship between the deflection angle θ of actuated member 177 and the voltage V applied between the movable and fixed combs. Because the torque levels off as the teeth interdigitate, the deflection angle θ approaches an asymptote. The deflection angle θ of actuator 100 is infinitely variable through the range of curve 305. The asymptotic nature of the response is beneficial for operating actuator 100 in a bistable mode: for example, an "on" or "off" state can be defined using an applied voltage Vs between the movable comb and one of the fixed combs. Stable states can be defined over the range of deflection angles using controlled voltage levels.

Figure 3G:
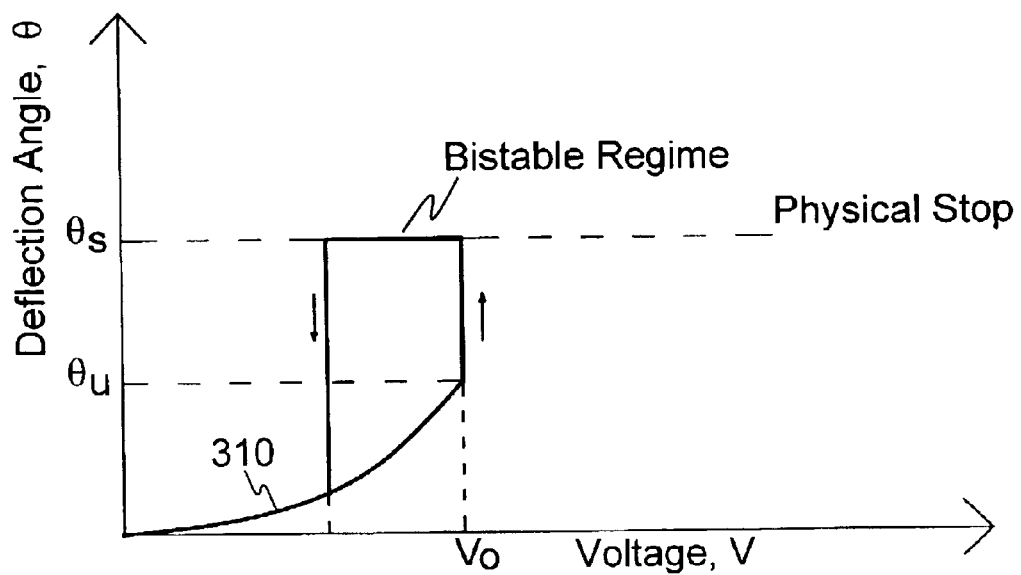
FIG. 3G includes a curve 310 illustrating the relationship between the deflection angle θ of a parallel-plate actuator (e.g., of the type described in the above-cited Hornbeck patents) and the voltage applied between the movable and fixed plates.

FIG. 3G includes a trace 310 illustrating the relationship between the deflection angle θ of a rotational actuator (e.g., of the type described in the above-cited Hornbeck patents) and the voltage applied between the movable and fixed plates. The electrostatic torque T increases approximately quadratically with applied voltage, while the mechanical opposition to torque offered by the hinge increases linearly with deflection angle. As a consequence, the electrostatic torque overcomes the hinge at an angle θu, which typically represents about one third of the initial gap between parallel plates. Upon reaching the unstable angle θu, the movable portion of the parallel-plate actuator "snaps" to a stable state θs defined by a physical stop, or "landing pad."

The comb actuators employed in embodiments of the invention offer significant advantages over parallel-plate actuators. For example, the greater torque provided by the comb actuator means that, for comparable deflection angles, comb actuators can employ suspensions with much higher stiffness as compared with parallel-plate actuators. Consequently, fabrication yield, resonance frequencies, response times, insensitivity to vibration and shock, and device reliability are significantly improved. Moreover, the stiffer hinges can be made from materials that resist the fatigue other materials suffer due to repeated flexing, which may improve the useable life of actuators in accordance with the invention. Many variations in hinge dimension and shape (e.g., serpentine) can be used to reduce or otherwise alter hinge stiffness, if desired.

Comb actuator 100 does not require mechanical stops because the deflection angle is a stable function of the applied voltage and the spring constant of hinge 115, particularly when the deflection angle is in an area of the response curve (e.g., curve 305 of FIG. 3E) at which deflection angle is only very weakly affected by small variations in applied voltage. The ability to operate without mechanical stops is a significant advantage over conventional micro-mirrors that use landing pads to position mirrors in "on" and "off" states and that seek to ameliorate the stiction problem using e.g. landing pads that employ special materials that reduce adhesion and spring arrangements and driving waveforms that overcome stiction.

Landing pads, such as those passivated by an oriented monolayer, can be included in embodiments of the invention, but are not required. Landing pads are not necessary because the comb actuator has a natural stopping point that depends upon the applied voltage (e.g., voltage Vs of FIG. 3F). However, if landing pads are desired, the higher torque and stiffer hinges of the comb actuator advantageously provide greater torque for overcoming stiction forces.

For bistable operation, the applied voltage V can be selected to produce just two stable states, e.g. such that deflection angle θ at which the driving electrostatic torque equals the restoring torque of hinge 115 corresponds to a desired "on" or "off" state. The number of operational states need not be defined by stops, but can instead be defined using any number of allowed signal combinations applied between the fixed and movable combs. For example, actuator 100 can have the two operational states of FIGS. 3C and 3D by limiting the number of signal combinations to the two that produce the depicted "on" and "off" states. In general, actuator 100 can employ N signal combinations to produce N states.

Returning to FIG. 1, hinge 115 extends diagonally across actuator 100, but might be oriented differently, for example along one edge or across the middle of actuator 100 in parallel with an edge. However, extending hinge 115 diagonally enables a longer and therefore more flexible hinge, and supports the use of teeth of varying length. Configured as shown, the longer teeth begin to interdigitate before the shorter teeth as voltage is applied, with more teeth coming into play as the torque required to twist hinge 115 increases.

Returning to FIG. 3E, torque generated between a single moving tooth and two corresponding fixed teeth has three overlapping regions. In the first region, torque increases relatively slowly with applied voltage until the deflection angle at which the movable tooth is lightly interdigitated with corresponding fixed teeth. The torque increases rapidly in the second region with significant interdigitation. In the third region, the torque asymptotically saturates as the interdigitation is completed. In rotational comb actuators that employ teeth of different lengths, these three regions of torque generation occur at different voltages for teeth of different lengths, so the overall actuator responds somewhat linearly to the applied driving voltage. The effect is to produce a more linear actuator response than a similar rotational comb actuator in which all teeth are of similar length. Also desirable, comb actuators with teeth of various lengths exhibit more damping than otherwise similar actuators in which all the teeth are of equal length.

Figure 4A:
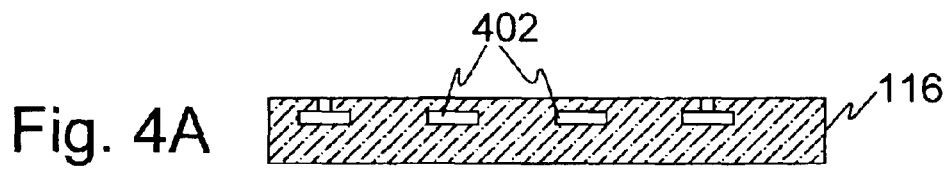
FIGS. 4A through 4Y depict a process of fabricating an actuator similar to actuator 100 of FIGS. 1, 2, 3A, and 3B.
Figure 4B:
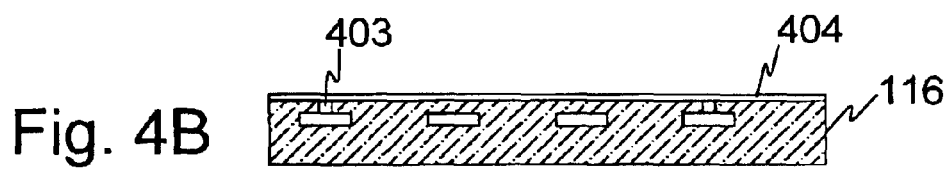
Figure 4C:
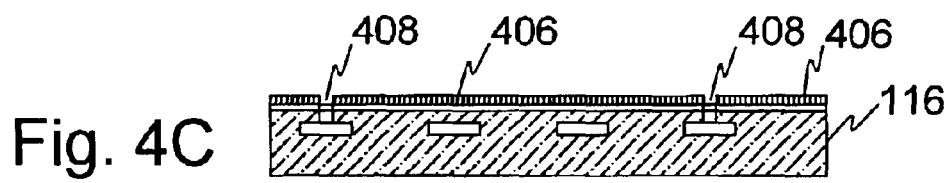
Figure 4D:
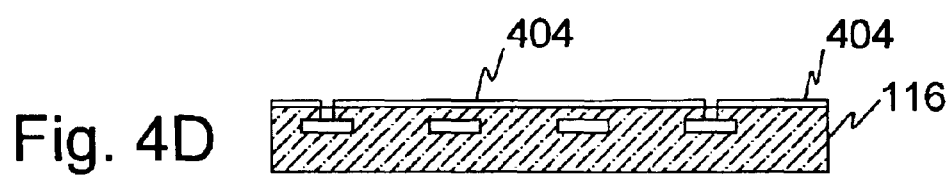
Figure 4E:
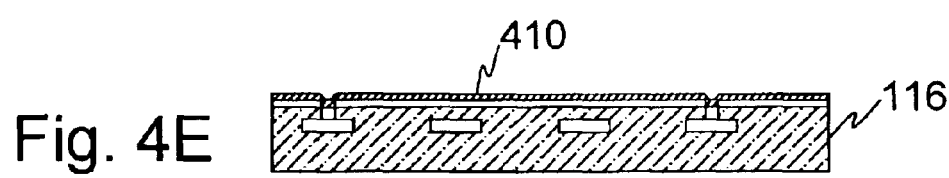
Figure 4F:
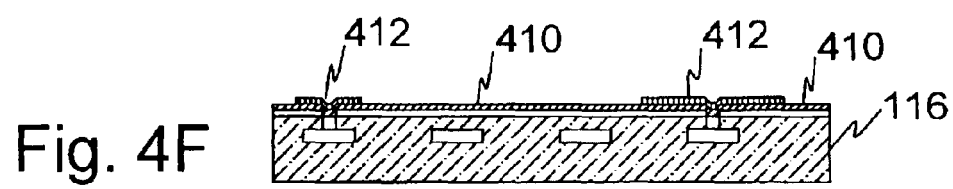
Figure 4G:
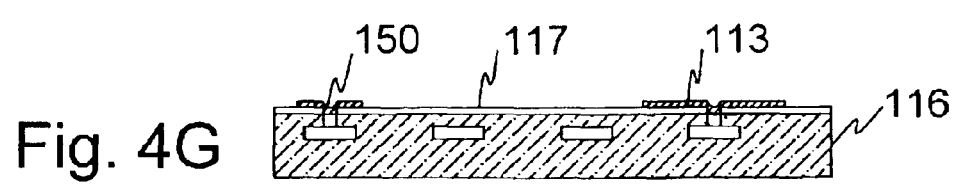
Figure 4H:
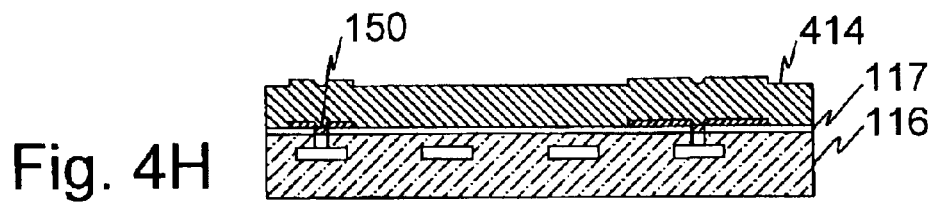
Figure 4I:
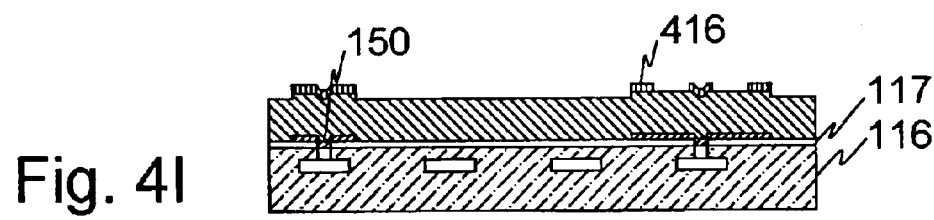
Figure 4J:
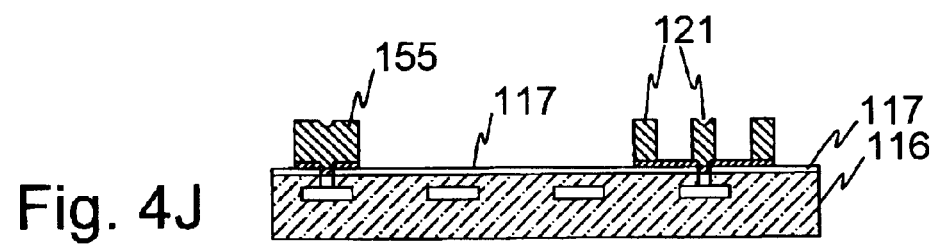
Figure 4K:
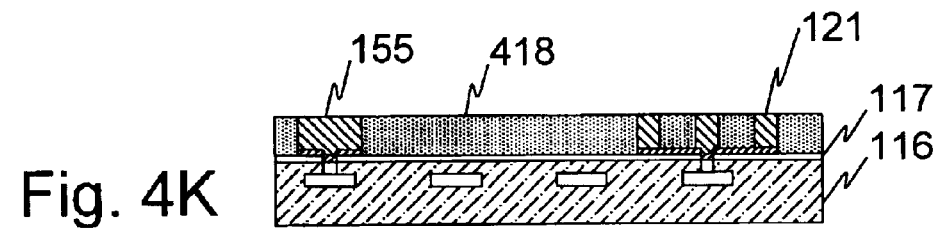
Figure 4L:
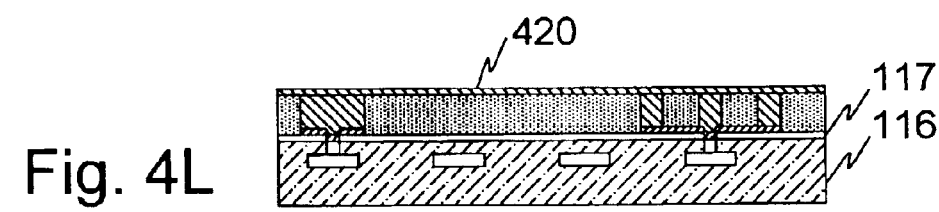
Figure 4M:
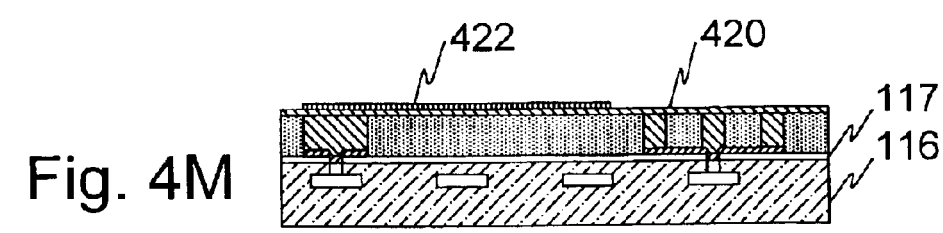
Figure 4N:
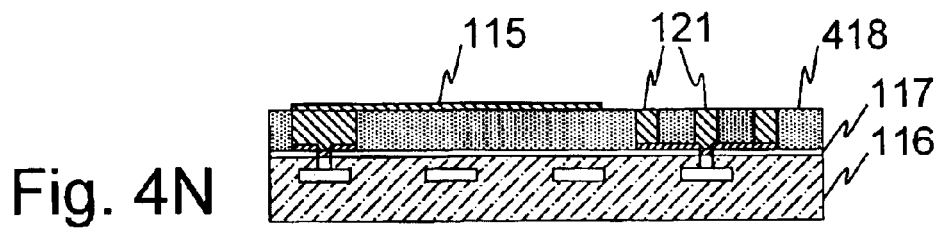
Figure 4O:
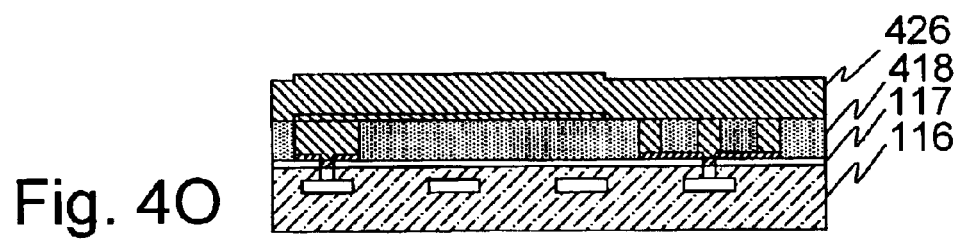
Figure 4P:
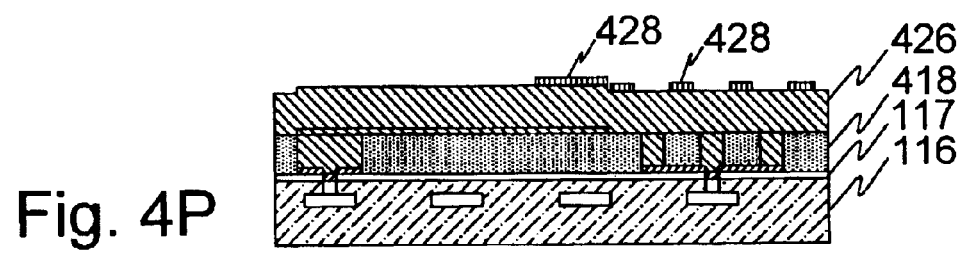
Figure 4Q:
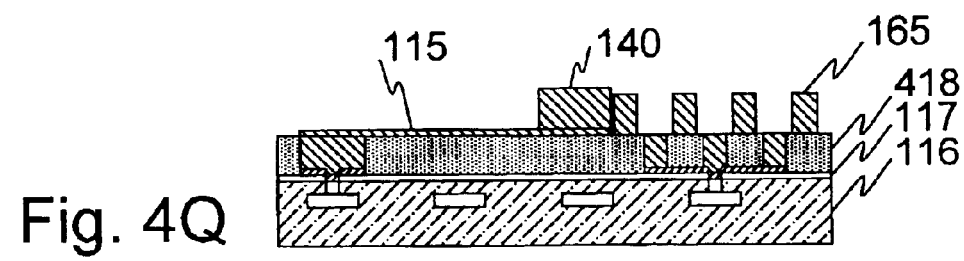
Figure 4R:
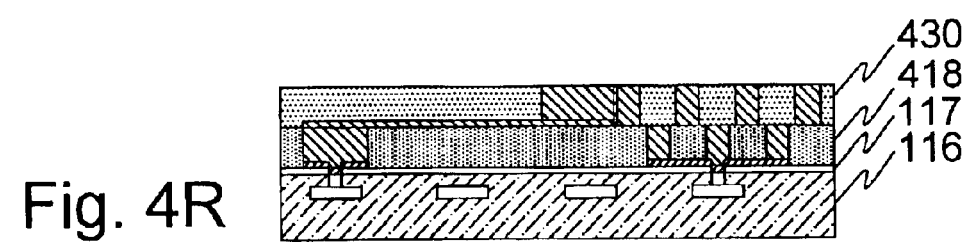
Figure 4S:
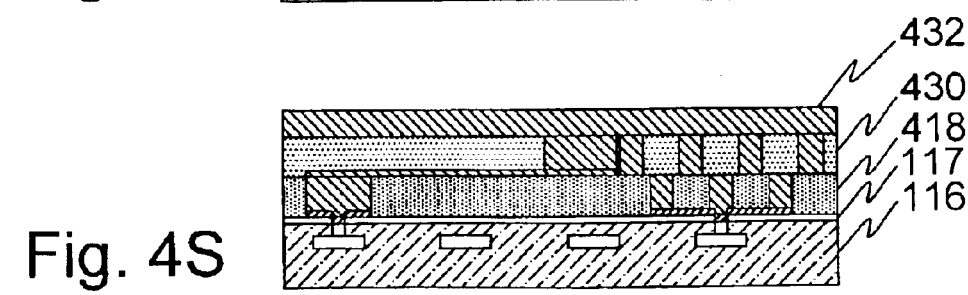
Figure 4T:
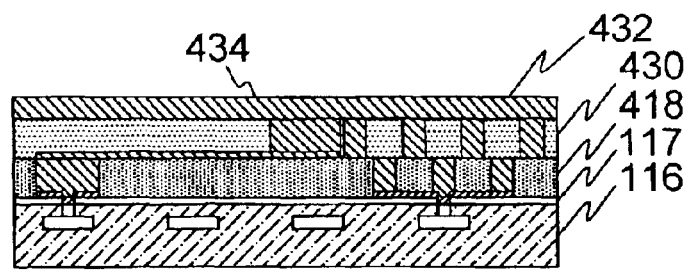
Figure 4U:
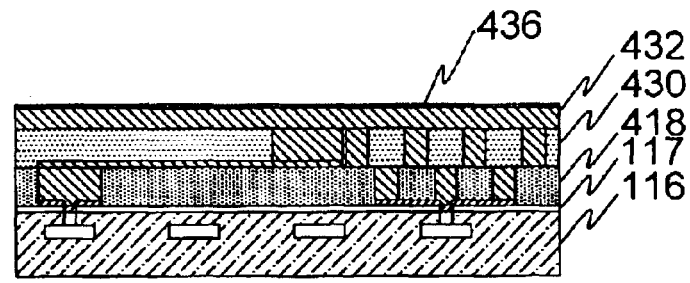
Figure 4V:
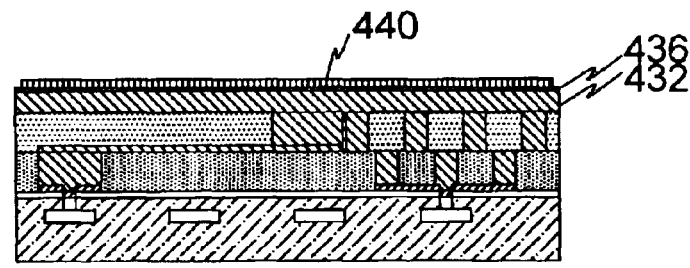
Figure 4W:
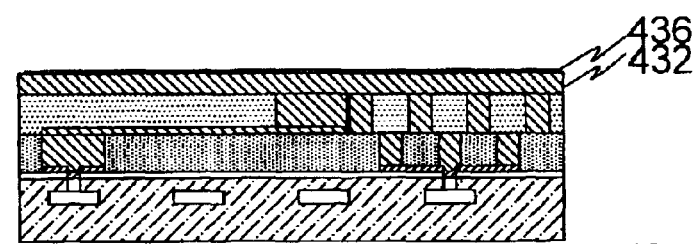
Figure 4X:
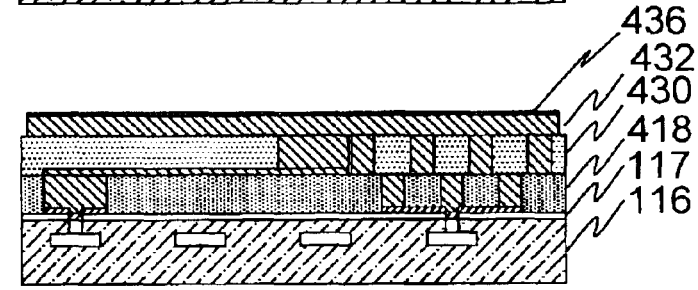
Figure 4Y:
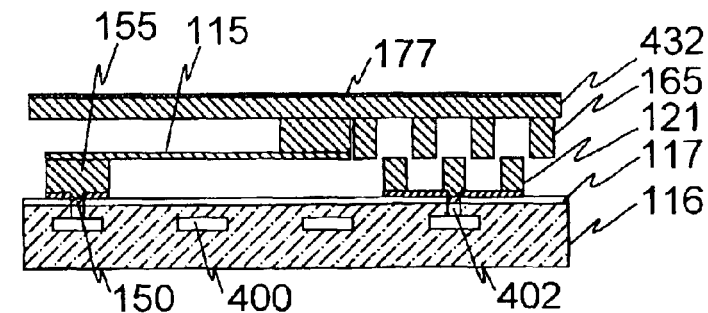

FIGS. 4A through 4Y depict a process of fabricating an actuator similar to actuator 100 of FIGS. 1, 2, 3A, and 3B, like-numbered elements being the same or similar; this process sequence develops along line A–A' of FIG. 3A, culminating with a cross section similar to that of FIG. 3B, like-numbered element being the same or similar.

The process begins (FIG. 4A) with substrate 116, an ASIC in this example. Substrate 116 includes a number of conductive traces 402, shown as rectangles, connected to the requisite drive electronics (not shown) within substrate 116. Conductive vias 403 extend up from traces 402 to the surface of substrate 116.

As depicted in FIG. 4B, the exposed surface of substrate 116 is coated with a silicon nitride layer, with or without an underlying silicon dioxide layer, to produce an insulating layer 404. The resulting structure is then masked using a photoresist layer 406, which is patterned to define contact areas 408 (FIG. 4C) within which electrodes 111, 113, and 150 will make contact to vias 403. (The cross-section of FIGS. 4A–4Y does not intersect electrode 111). Insulating single or double layer 404 is then etched to expose contact areas 408, leaving the structure of FIG. 4D.

Next, a layer of metal 410 is deposited using a conventional metalization process, resulting in the structure of FIG. 4E. Metal layer 410 is then patterned with photoresist 412 (FIG. 4F) to define electrodes 111, 113, and 150. The exposed portions of metal layer 410 are then etched and photoresist mask 412 is removed, leaving electrodes 111 (not shown), 113, and 150 (FIG. 4G). Metal layer 410 makes contact to underlying vias 403 to communicate with underlying traces 402. The patterned layer 404 becomes insulating layer 117, which acts as an etch stop when removing sacrificial material at later stages of fabrication.

The process sequence depicted in FIGS. 4H through 4K defines fixed combs 107 and 109 and hinge posts 155. Referring first to FIG. 4H, a layer of highly doped polysilicon 414 is deposited to an appropriate thickness for the height (i.e., normal to plane 170 of FIG. 1) of fixed combs 107 and 109, two microns in this example. A photoresist mask 416 (FIG. 4I) then defines fixed combs 107 and 109, hinge post 115, and an alignment pattern (not shown) for alignment of the later-formed movable teeth.

Layer 414 and the other conductive layers can be formed of materials other than polysilicon. For example, polysilicon-germanium alloys can be deposited and annealed at lower temperatures, potentially allowing for simpler and less expensive ASIC metallization processes. Another alternative is to use metal or a metal alloy instead of polysilicon, also allowing lower temperature processing; however, degradation of the mechanical properties of a hinge would occur due to the sensitivity of metals and metal alloys to mechanical fatigue compared with that of polysilicon or single-crystal silicon.

A silicon deep reactive-ion etch (RIE) removes unmasked portions of polysilicon layer 414, leaving walls that can be close to normal with respect to the surface of film 414 and with a good aspect ratio. The photoresist mask 416 is then removed, leaving conductive posts 155 and the fixed comb teeth 121 shown in the cross-section of FIG. 4J. The whole wafer is then coated with a sacrificial material 418, such as silicon dioxide. For subsequent higher temperature processing, silicon dioxide or another inorganic dielectric is used, while for low temperature processing, photoresist can be used as a sacrificial layer. The resulting structure is then planarized, e.g. by chemical mechanical polishing, to produce the cross section of FIG. 4K.

The planarization process removes the topography from the oxide, polysilicon, etc. A suitable method of oxide polishing employs a slurry that consists of a silica-based colloidal suspension in a dilute alkaline solution (a pH of 10–11). The alkaline process hydrolyzes the oxide surface, weakening silicon-oxide bonds. This chemical erosion combines with mechanical erosion to selectively remove relatively high surface features.

The process sequence of FIGS. 4H through 4J is repeated with a different mask sequence to form hinge 115. (In other embodiments, the bottom portions of movable combs 130 and 135, the top portions of fixed combs 107 and 109, or both, are formed at the same time.) First, as depicted in FIG. 4L, a second layer of highly doped polysilicon 420 is deposited to a depth appropriate for the thickness of hinge 115, 0.5 microns in this example. Hinge 115, bridge 140, and, if desired, the bottom 0.5 microns of movable combs 130 and 135, the top 0.5 microns of fixed combs 107 and 109, or both, are patterned on layer 420 with a photoresist mask 422 (FIG. 4M). The exposed polysilicon is then etched away, using an RIE, before removing photoresist mask 422. The resulting structure is depicted in FIG. 4N, in which the cross-section includes a portion of hinge 115.

Next, the process sequence of FIGS. 4H through 4K is repeated with different masks to form movable combs 130 and 135 and bridge 140. First, as depicted in FIG. 4O, a third layer of highly doped polysilicon 426 is deposited to a depth appropriate for the thickness of movable combs 130 and 135, 1.5 microns in this example. Windows (not shown) are then opened in layer 426 to expose the alignment features in layer 414. Movable combs 130 and 135 and bridge 140 are patterned on layer 426 with a photoresist mask 428 (FIG. 4P).

The exposed polysilicon is then etched away, using an RIE, before removing the photoresist mask. The resulting structure, including portions of bridge 140 and movable teeth 165, is depicted in FIG. 4Q. The structure is then coated with a sacrificial material 430 and planarized (FIG. 4R) in the manner discussed above in connection with FIG. 4K.

FIG. 4S depicts the first step in forming actuated member 177. First, a fourth highly doped polysilicon layer 432 is deposited, to a depth of approximately 0.5 microns in this embodiment. The resulting structure is annealed at about 1,000 to 1,100 degrees Centigrade. Next, layer 432 is smoothed to a mirror finish using chemical mechanical polishing techniques commonly applied to polysilicon (see for e.g. A. A. Yaseen, et al, J. Electrochem. Soc. 144, 237–242, 1997). In one embodiment, this polishing step leaves a surface 434 (FIG. 4T) having an approximate RMS roughness of less then 0.5 nm. If the initial surface finish of layer 432 is adequate, the polishing step can be skipped. The resulting polished polysilicon layer 432 is slightly thinned (by approximately 10% of the initial thickness). A reflective layer 436 is then formed over surface 434 (FIG. 4U). Layer 436 can be a single or compound layer, and is formed in one embodiment by depositing first a chromium adhesion layer and then a reflective gold or aluminum layer.

The sequence of FIGS. 4A through 4U depicts the formation of a single actuator 100. However, arrays of such actuators will normally be formed together, as discussed above in connection with FIG. 2, for example. FIGS. 4V through 4X and the associated discussion illustrate how individual mirrors are separated in accordance with a multiple-mirror embodiment.

First, a photoresist layer 440, formed over the total array surface, is patterned to define the mirror surfaces (FIG. 4V). The exposed portions of reflective layer 436 are then removed, leaving metal layer 436 patterned as an array of mirrors (FIG. 4W). What remains of metal layer 436 then masks the underlying polysilicon layer 432 during a dry RIE process that removes portions of layer 432 to separate the actuated members of the array (FIG. 4X). Finally, a silicon-dioxide dielectric etch, using wet or vapor hydrofluoric acid, for example, removes the remaining material of sacrificial layers 430 and 418; nitride insulating layer 117 acts as an etch stop. The wet structure is then carefully rinsed and dried. A suitable drying process is described in "Supercritical Carbon Dioxide Solvent Extraction From Surface-Micromachined Micromechanical Structures," by C. W. Dyck, et al. (SPIE Micromachining and Microfabrication, October 1996), which is incorporated herein by reference. The resulting structure, depicted in FIG. 4Y, is similar to that of FIG. 3B, like-numbered elements being the same or similar.

When monolithic fabrication with actuators built directly on top of driving electronics is used, polysilicon annealing is performed after all metallization steps, except mirror coating, and the interconnects provided for the metallization and driving electronics are of materials, such as tungsten, that exhibit high melting temperatures. When polysilicon-germanium, metal, or metal alloys are used for structural members of the actuators, annealing temperatures are lower and conventional metallization of CMOS and vias with aluminum or copper is possible.

Figure 5:
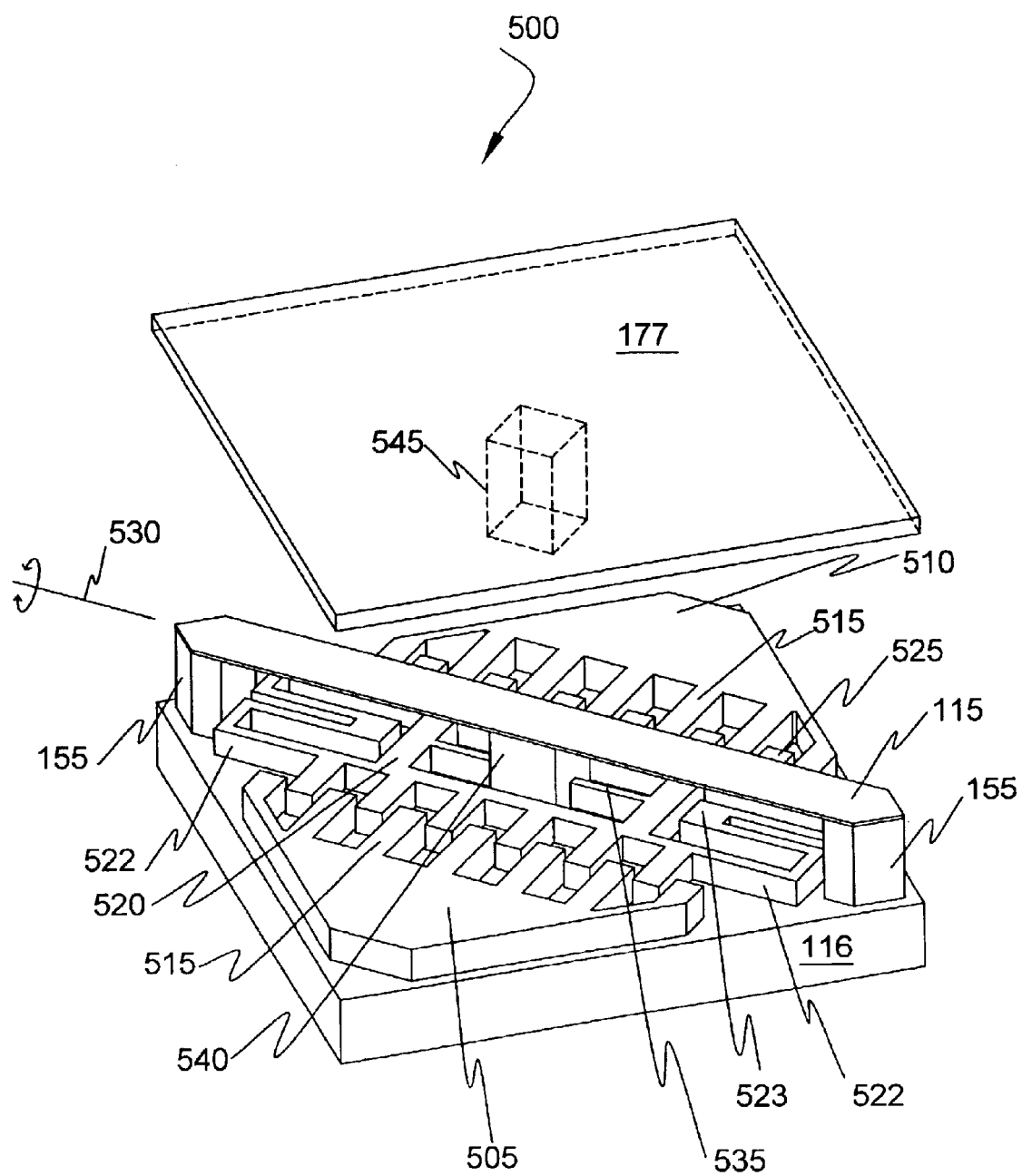
FIG. 5 depicts an actuator 500 in accordance with another embodiment.

FIG. 5 depicts an actuator 500 in accordance with another embodiment. Actuator 500 is in many ways similar to actuator 100 of FIG. 1, like-numbered elements being the same or similar. Actuator 500 differs from actuator 100, however, in that actuator 500 employs a translational comb drive in place of the rotational comb drive of actuator 100. The hinge and relating support members are adapted, in this embodiment, to convert from translational to rotational motion. Some elements (e.g., address electrodes) are omitted from FIG. 5 for ease of illustration.

Actuator 500 includes a pair of fixed combs 505 and 510 mounted on substrate 116, each comb including a number of fixed teeth 515. Actuator 500 also includes a movable comb 520 having two sets of movable teeth 525 that interdigitate with fixed teeth 515 (comb 520 might be considered two combs connected back-to-back). Fixed combs 505 and 510 electrically connect to respective addressing electrodes (not shown) and movable comb 520 connects to another electrode (also not shown) via conductive hinges 522 and anchors 523 so that a potential can be applied between the fixed and movable combs. When applied, such potentials cause movable comb 520 to move translationally in the plane of teeth 515 and in a direction perpendicular to the fulcrum axis 530 of hinge 115.

Movable comb 520 connects to hinge 115 via a pair of hinges 535 and a vertical bridge 540 that together convert the translational movement of movable comb 520 into a twisting movement of hinge 115. (This aspect of actuator 500 is depicted more clearly in FIGS. 7A an 7B.) Actuated member 177 connects to hinge 115 via a second bridge 545, so that actuated member 177 tilts as hinge 115 twists in response to the movement of comb 520. This embodiment simplifies the important task of aligning the fixed and movable teeth because the coplanar fixed and movable combs can be defined using the same mask but requires one additional layer to be built compared with the rotational actuator.

Many variations in hinge dimension and shape (e.g., coil or serpentine) can be used to reduce stiffness if desired. Moreover, additional process steps can be employed to alter the thickness of hinges 522 and 535 relative to comb 520. Hinges 522 and 535 are sufficiently stiff in a direction parallel to fulcrum axis 530 to prevent movable comb 520 from contacting either of fixed combs 505 or 510.

Figure 6A:
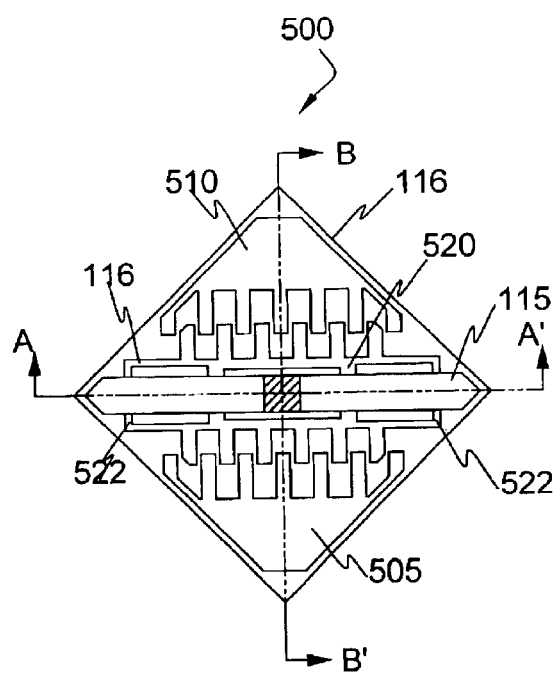
FIG. 6A is a top view of actuator 500 of FIG. 5. The actuated member 177 is removed to expose the underlying features.
Figure 6B:
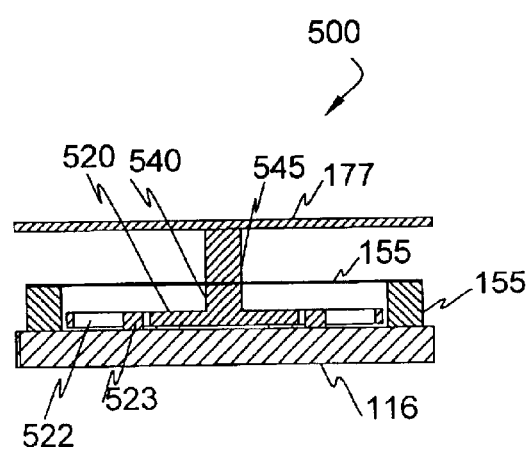
FIGS. 6B and 6C are cross-sectional views of actuator 500 taken along lines A–A' and B–B', respectively, including actuated member 177.
Figure 6C:
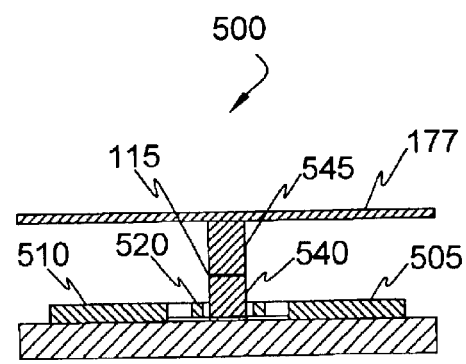

FIG. 6A is a top view of actuator 500 of FIG. 5: actuated member 177 is removed to expose the underlying features. FIGS. 6B and 6C are cross-sectional views of actuator 500 taken along lines A–A' and B–B', respectively, including actuated member 177. As evident in FIGS. 6B and 6C, anchors 523 hold movable comb 520 and associated hinges 522 above substrate 116 so that comb 520 moves freely, without rubbing against substrate 116. The space is created e.g. using a sacrificial oxide layer in the manner discussed above in connection with FIGS. 4A–4Z.

Figure 7A:
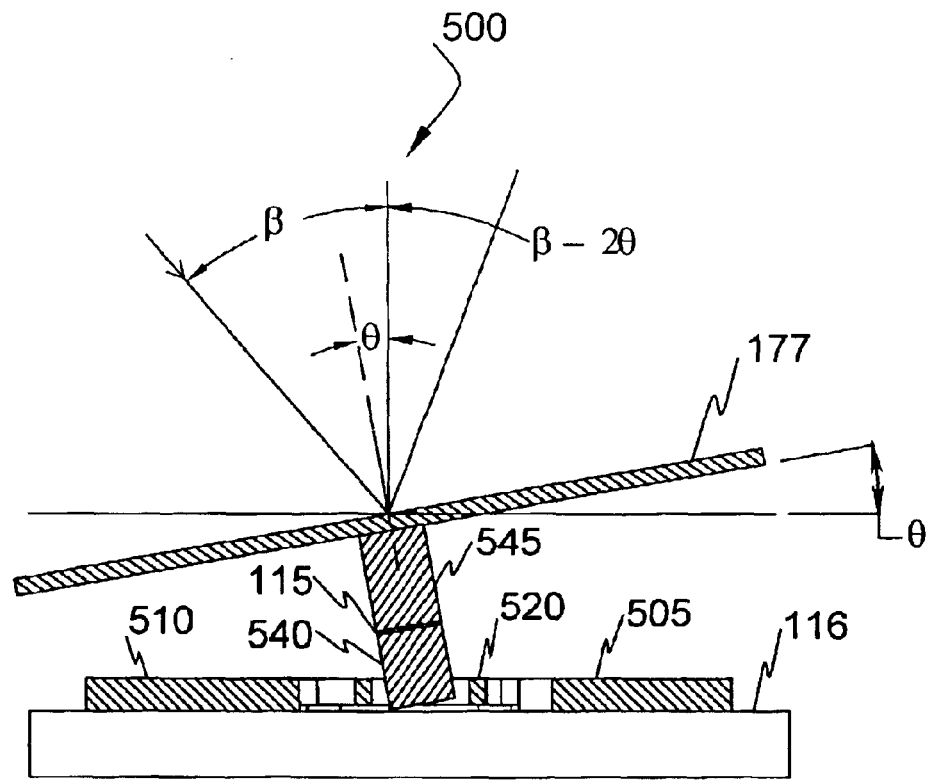
FIGS. 7A and 7B are cross-sectional views of actuator 500 taken along line B–B' of FIG. 6A with voltage applied between the movable and fixed combs to induce translational motion.
Figure 7B:
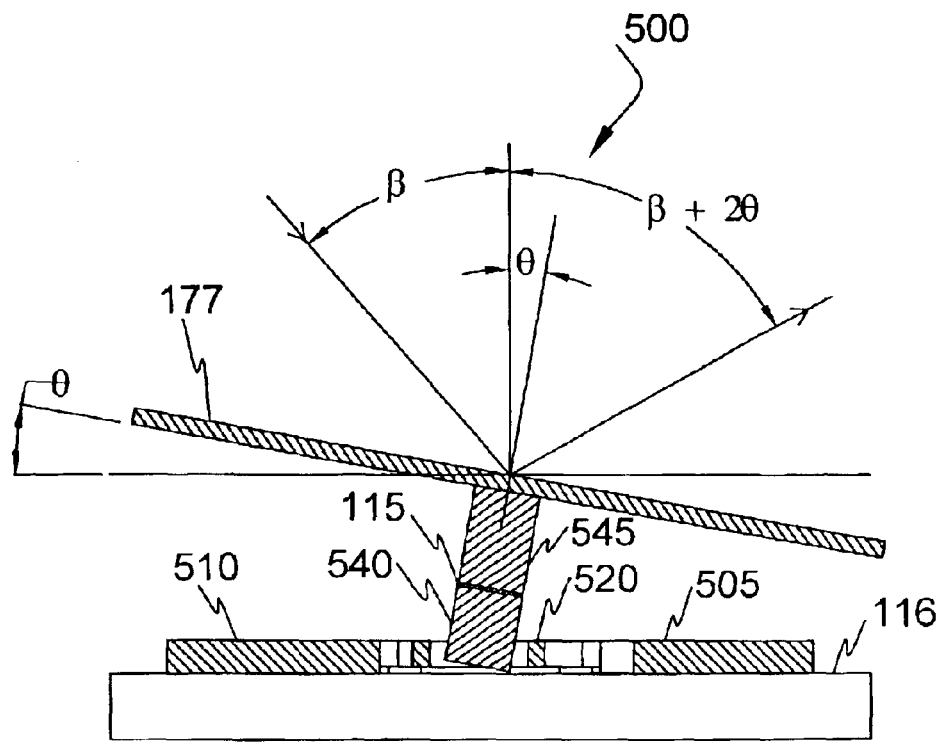

FIGS. 7A and 7B are cross-sectional views of actuator 500 taken along line B—B of FIG. 6A with voltage applied between the movable and fixed combs to induce translational motion. In FIG. 7A, translating movable comb 520 to the right tilts the surface of actuated member 177 θ degrees to the left, where θ is typically about ten degrees; in FIG. 7B, translating movable comb 520 to the left tilts the surface of actuated member 177 θ degrees to the right. The spacing between the bottom of bridge 540 and the surface of substrate 116 is sufficient to prevent contact between the two. In other embodiments, the bottom of bridge 540 may be modified to provide a mechanical stop.

Figure 8:
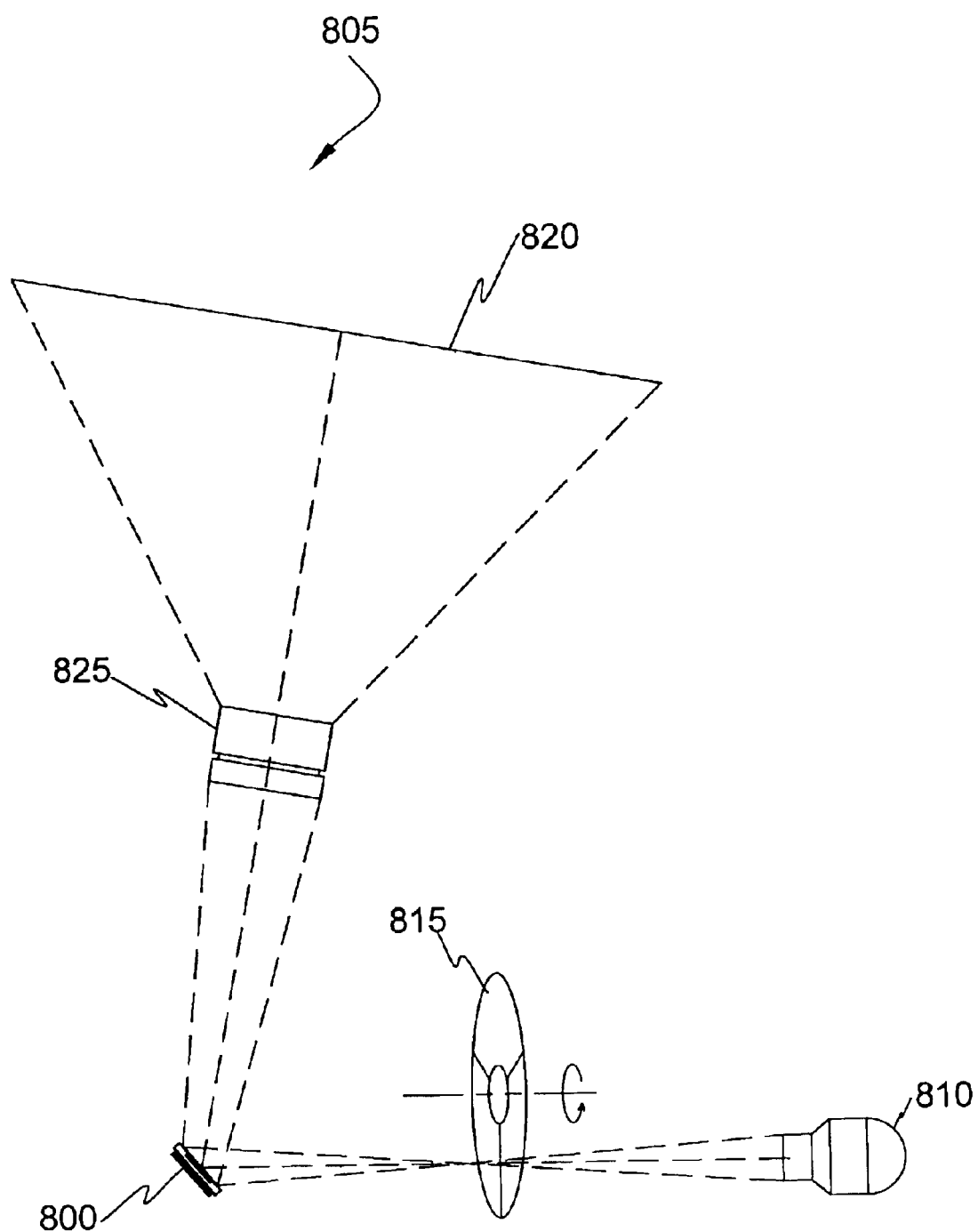
FIG. 8 depicts a mirror array 800 in accordance with one embodiment incorporated into an otherwise conventional projection-display system 805.

FIG. 8 depicts a mirror array 800 in accordance with one embodiment incorporated into an otherwise conventional projection-display system 805. The display system includes a lamp 810 focusing white light through a color wheel 815 onto mirror array 800. Mirror array 800 selectively reflects portions of the resulting colored light onto a display surface 820 via a projection lens 825.

For additional information relating to MEMS actuators in general, and optical cross-connect switches in particular, see the following U.S. patent applications, each of which is incorporated by reference:

a. Ser. No. 09/880,456, entitled, "Optical Cross Connect Switching Array System With Electrical And Optical Position Sensitive Detection," by Vlad Novotny, filed Jun. 12, 2001; and b. Ser. No. 09/981,628, entitled "Micro-Opto-Electro-Mechanical Switching System," by Vlad J. Novotny et al., filed Oct. 15, 2001.

While the present invention has been described in connection with specific embodiments, variations of these embodiments will be obvious to those of ordinary skill in the art. For example, actuators in accordance with embodiments of the invention can be used as optical switches in fiber-optical systems, and the mirrors can be replaced by other light-modulating surfaces, such as refractive lenses, diffraction gratings or thin-film stacks and materials can differ from polysilicon. Therefore, the spirit and scope of the appended claims should not be limited to the foregoing description.

What is claimed is:

1. An actuator comprising:
   a. a substrate;
   b. a fixed comb connected to the substrate and including a plurality of fixed teeth extending in a first plane;
   c. a movable comb movable with respect to the fixed comb and including a plurality of movable teeth extending in a second plane;
   d. a hinge connected between the substrate and the movable comb, the hinge facilitating movement of the movable comb with respect to the fixed comb along a fulcrum axis; and
   e. an actuated member connected to the movable comb and the hinge;
   f. wherein the first and second planes extend between the substrate and the actuated member; and
   g. wherein the actuated member is adapted to tilt along the fulcrum axis when the movable comb moves with respect to the fixed comb.

2. The actuator of claim 1, wherein the fulcrum axis is substantially parallel to the first and second planes.

3. The actuator of claim 1, further comprising a second movable comb including a second plurality of movable teeth extending in a direction parallel to the first-mentioned plurality of movable teeth.

4. The actuator of claim 3, wherein the second movable comb is disposed in the second plane, and wherein the fulcrum axis extends between the first and second movable combs from a perspective normal to the second plane.

5. The actuator of claim 4, further comprising a bridge connected to the hinge, the first movable comb, and the second movable comb.

6. The actuator of claim 1, further comprising a second fixed comb including a second plurality of fixed teeth extending in a direction parallel to the first-mentioned plurality of fixed teeth.

7. The actuator of claim 6, wherein the first-mentioned fixed teeth are electrically isolated from the second fixed teeth.

8. The actuator of claim 1, wherein the actuated member comprises a mirror.

9. The actuator of claim 1, wherein the actuator is one of a plurality of similar actuators in a mirror array.

10. The actuator of claim 1, wherein at least one of the hinge, the fixed comb, the actuated member, and the movable comb comprises germanium.

11. The actuator of claim 1, further comprising an integrated circuit having a first contact pad electrically connected to the movable comb and a second contact pad electrically connected to the fixed comb.

12. An actuator comprising:
   a. a substrate;
   b. a fixed comb connected to the substrate and including a plurality of fixed teeth extending in a first plane;
   c. a movable comb, including a plurality of movable teeth extending in a second plane;
   d. a hinge connected between the substrate and the movable comb, the hinge facilitating movement of the movable comb with respect to the fixed comb; and
   e. an actuated member connected to the movable comb and extending in a third plane;
   f. wherein the first and second planes extend between the substrate and the third plane; and
   g. wherein the first and second planes are coplanar.

13. An actuator comprising:
   a. a substrate;
   b. a fixed comb connected to the substrate and including a plurality of fixed teeth extending in a first plane;
   c. a movable comb, including a plurality of movable teeth extending in a second plane;
   d. a hinge connected between the substrate and the movable comb, the hinge facilitating movement of the movable comb with respect to the fixed comb; and
   e. an actuated member connected to the movable comb and extending in a third plane;
   f. wherein the first and second planes extend between the substrate and the third plane; and
   g. wherein the substrate includes an insulating surface, a first electrode connected to the movable comb, and a second electrode connected to the fixed comb.

14. An actuator comprising:
   a. a substrate;
   b. a fixed comb connected to the substrate and including a plurality of fixed teeth extending in a first plane;
   c. a movable comb, including a plurality of movable teeth extending in a second plane;
   d. a hinge connected between the substrate and the movable comb, the hinge facilitating movement of the movable comb with respect to the fixed comb; and
   e. an actuated member connected to the movable comb and extending in a third plane;
   f. wherein the first and second planes extend between the substrate and the third plane; and
   g. wherein at least a portion of the movable comb is disposed between the actuated member and the fixed comb.

15. An actuator comprising:
   a. a substrate;
   b. a fixed comb connected to the substrate and including a plurality of fixed teeth extending in a first plane;
   c. a movable comb, including a plurality of movable teeth extending in a second plane;
   d. a hinge connected between the substrate and the movable comb, the hinge facilitating movement of the movable comb with respect to the fixed comb; and
   e. an actuated member connected to the movable comb and extending in a third plane;
   f. wherein the first and second planes extend between the substrate and the third plane; and
   g. wherein the actuated member obscures at least a portion of the fixed and movable combs from a perspective normal to the first plane.

16. An actuator comprising:
   a. a substrate;
   b. a fixed comb connected to the substrate and including a plurality of fixed teeth extending in a first plane;
   c. a movable comb, including a plurality of movable teeth extending in a second plane;
   d. a hinge connected between the substrate and the movable comb, the hinge facilitating movement of the movable comb with respect to the fixed comb; and e. an actuated member connected to the movable comb and extending in a third plane;

f. wherein the first and second planes extend between the substrate and the third plane; and g. wherein an applied voltage potential between the fixed comb and the movable comb moves the movable comb relative to the fixed comb to tilt the actuated member along a fulcrum axis by a fixed deflection angle, and wherein the applied voltage potential defines the fixed deflection angle.

17. The actuator of claim 16, wherein a second applied voltage potential between the fixed comb and the movable comb moves the movable comb relative to the fixed comb to tilt the actuated member by a second fixed deflection angle along the fulcrum axis, and wherein the second applied voltage potential defines the second fixed deflection angle.

18. The actuator of claim 16, wherein the fixed deflection angle corresponds to an "on" state.

19. An actuator comprising:

a. a substrate;

b. a fixed comb connected to the substrate and including a plurality of fixed teeth extending in a first plane;

c. a movable comb, including a plurality of movable teeth extending in a second plane;

d. a hinge connected between the substrate and the movable comb, the hinge facilitating movement of the movable comb with respect to the fixed comb; and e. an actuated member connected to the movable comb and extending in a third plane;

f. wherein the first and second planes extend between the substrate and the third plane; and g. wherein at least two of the fixed teeth are of different lengths.

20. An actuator comprising:

a. a substrate;

b. a fixed comb connected to the substrate and including a plurality of fixed teeth extending in a first plane;

c. a movable comb, including a plurality of movable teeth extending in a second plane;

d. a hinge connected between the substrate and the movable comb, the hinge facilitating movement of the movable comb with respect to the fixed comb; and e. an actuated member connected to the movable comb and extending in a third plane;

f. wherein the first and second planes extend between the substrate and the third plane; and g. wherein at least two of the movable teeth are of different lengths.

21. A spatial light modulator comprising:

a. a plurality of separately actuated adjacent movable mirror surfaces disposed over a substrate and separated by interstitial spaces, wherein the adjacent movable mirror surfaces are arranged in an array extending over an array area, each movable mirror surface having an active-surface area; and b. a plurality of comb actuators, at least one comb actuator disposed between each movable mirror surface and the substrate;

c. wherein adding the active-surface areas produces a combined active-surface area at least 90 percent of the array area.

22. The spatial light modulator of claim 21, further comprising, for each mirror surface, at least one movable comb connected to the mirror surface; and a fixed comb interdigitated with the movable comb.

23. The spatial light modulator of claim 22, wherein at least one of the fixed combs is disposed in a first plane and at least one of the movable combs is disposed in a second plane extending between the first plane and at least one of the movable mirror surfaces.

24. The spatial light modulator of claim 22, further comprising a plurality of hinges, each hinge connected to a respective one of the plurality of movable combs.

25. The actuator of claim 21, further comprising an integrated circuit having first contact pads electrically connected to the movable combs and second contact pads electrically connected to the fixed combs.

26. A spatial light modulator comprising:

a. a plurality of adjacent movable mirror surfaces arranged in an array extending over an array area, each movable mirror surface having an active-surface area, wherein adding the active-surface areas produces a combined active-surface area at least 90 percent of the array area;

b. for each mirror surface, at least one movable comb connected to the mirror surface and a fixed comb interdigitated with the movable comb; and c. a plurality of hinges, each hinge connected to a respective one of the plurality of movable combs;

d. wherein each of the hinges is a torsional hinge.

27. A spatial light modulator comprising:

a. a plurality of adjacent movable mirror surfaces arranged in an array extending over an array area, each movable mirror surface having an active-surface area, wherein adding the active-surface areas produces a combined active-surface area at least 90 percent of the array area;

b. for each mirror surface, at least one movable comb connected to the mirror surface and a fixed comb interdigitated with the movable comb; and c. an integrated circuit having a first plurality of contact pads electrically connected to the movable combs and a second collection of contact pads electrically connected to the fixed combs.

28. A spatial light modulator comprising:

a. a plurality of adjacent movable mirror surfaces arranged in an array extending over an array area, each movable mirror surface having an active-surface area, wherein adding the active-surface areas produces a combined active-surface area at least 90 percent of the array area; and b. for each mirror surface, at least one movable comb connected to the mirror surface and a fixed comb interdigitated with the movable comb;

c. wherein at least one of the fixed and movable combs has teeth of different lengths.

29. A spatial light modulator comprising:

a. a plurality of adjacent movable mirror surfaces arranged in an array extending over an array area, each movable mirror surface having an active-surface area;

b. wherein adding the active-surface areas produces a combined active-surface area at least 90 percent of the array area; and c. wherein at least two of the movable teeth are of different lengths.

30. A projection system comprising:

a. a substrate;

b. a plurality of actuators disposed on the substrate, each actuator including:

i. a fixed comb connected to the substrate and including a plurality of fixed teeth;
ii. a movable comb, including a plurality of movable teeth; and
iii. a hinge connected between the fixed comb and the movable comb, the hinge facilitating movement of the movable comb with respect to the fixed comb; and c. an array of individually actuated members separated by interstitial spaces, each actuated member including a light-modulating surface connected to at least one of the movable combs;

d. wherein the fixed and movable combs are disposed between the actuated members and the substrate.

31. The projection system of claim 30, wherein the fixed comb defines a first plane, the movable comb defines a second plane, and the first and second planes are coplanar.

32. The projection system of claim 30, wherein at least one of the hinge, the fixed comb, the movable comb, and the actuated member comprises germanium.

33. The projection system of claim 30, further comprising an integrated circuit having first contact pads electrically connected to the movable combs and second contact pads electrically connected to the fixed combs.

34. A spatial light modulator disposed over a substrate and adapted to modulate light directed to the modulator, the spatial light modulator comprising:

a. a plurality of comb actuators, each actuator including;
i. a first comb including a first plurality of teeth; and
ii. a second comb including a second plurality of teeth; and
iii. wherein the first comb moves with respect to the second comb; and b. an actuated member disposed over the substrate and at least a portion of the first and second combs, the actuated member receiving a portion of the light;

c. wherein the actuated members are separated from one another by interstitial spaces and arranged in an array extending over a total array area.

35. The spatial light modulator of claim 34, wherein the interstitial spaces account for less than ten percent of the total array area.

36. The spatial light modulator of claim 34, wherein each actuated member reflects the respective portion of the light.

37. The spatial light modulator of claim 34, wherein each movable comb tilts the respective actuated member along a fulcrum axis.

38. The spatial light modulator of claim 37, wherein the actuated members tilt about 10 degrees.

39. The spatial light modulator of claim 34, wherein a first degree of tilt corresponds to an "on" state and a second degree of tilt corresponds to an "off" state.

40. The spatial light modulator of claim 39, wherein ones of the actuated members in the "on" state reflect the respective portion of the light through a projection lens, and ones of the actuated members in the "off" stage reflect the respective portion of the light away from the projection lens.

41. The spatial light modulator of claim 34, wherein at least one of the combs includes germanium.

42. The spatial light modulator of claim 34, further comprising an integrated circuit having first contact pads electrically connected to the first combs and second contact pads electrically connected to the second combs.

43. The spatial light modulator of claim 34, wherein the actuated member tilts along a fulcrum axis to produce a range of deflection angles.

44. The spatial light modulator of claim 43, wherein a range of voltage applied between one of the first combs and one of the second combs moves the respective actuated member over the range of deflection angles.

45. The spatial light modulator of claim 34, further comprising a hinge connected between the first and second combs.

* * * * *